United States Patent
Ohba et al.

(10) Patent No.: US 6,602,929 B1
(45) Date of Patent: Aug. 5, 2003

(54) LIQUID RADIATION-CURABLE RESIN COMPOSITION, OPTICAL FIBER COATING COMPOSITION, AND OPTICAL FIBER

(75) Inventors: Toshio Ohba, Annaka (JP); Shouhei Kozakai, Annaka (JP); Kazunori Kondo, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 275 days.

(21) Appl. No.: 09/635,622

(22) Filed: Aug. 10, 2000

(30) Foreign Application Priority Data

Aug. 10, 1999 (JP) ............................................. 11-225956

(51) Int. Cl.⁷ ............................................... C08G 18/67
(52) U.S. Cl. ......................................... 522/97; 385/128
(58) Field of Search .............................. 522/97; 385/128

(56) References Cited

U.S. PATENT DOCUMENTS 3,907,865 A * 9/1975 Miyata et al.

FOREIGN PATENT DOCUMENTS

| JP | B2119694 | 4/1989 |
|----|----------|--------|
| JP | B2-2522663 | 5/1996 |
| JP | B2-2547021 | 8/1996 |

* cited by examiner

*Primary Examiner*—Rachel Gorr
(74) *Attorney, Agent, or Firm*—Birch, Stewart, Kolasch & Birch, LLP

(57) ABSTRACT

A liquid radiation-curable resin composition comprising the reaction product obtained by reacting (A) a polyether having a (meth)acryloyl group and a hydroxyl group at opposite ends with (B) a diisocyanate having two isocyanate groups in a molar ratio from 1.8/1 to 2.2/1 has a low viscosity enough to coat on an optical fiber at a high speed. Upon curing, it forms a coating having a minimized water absorption on the optical fiber.

8 Claims, No Drawings

LIQUID RADIATION-CURABLE RESIN COMPOSITION, OPTICAL FIBER COATING COMPOSITION, AND OPTICAL FIBER

This invention relates to a liquid radiation-curable resin composition having a low viscosity and improved coating and curing characteristics and curing into a film with a minimized water absorption and thus suitable as coating material on optical fibers. It also relates to an optical fiber coating composition and an optical fiber coated therewith.

BACKGROUND OF THE INVENTION

Optical communications fibers include a variety of types such as quartz glass, multi-component glass and plastic fibers. In reality, quartz glass fibers are vastly used in a wide variety of applications because of their light weight, low loss, high durability and high transmission capacity. Since quartz glass fibers are very thin and sensitive to external factors, quartz glass fibers for optical communications are generally of the construction that a quartz glass fiber which is spun from a melt is coated with a liquid curable resin capable of curing to a soft state, the coating is cured to form a primary coating, and the primary coating is protected with a secondary coating using a liquid curable resin capable of curing to a hard state.

The primary coating material is required to have a low Young's modulus and low temperature dependence thereof for preventing microbend losses from being induced by external stresses or temperature changes. Other requirements on the primary coating material are durability (heat and water resistance), low water absorption, low hydrogen release, and a high refractive index. The secondary coating material is required to have a sufficient hardness, flexibility, resistance to acid and alkali attacks, and low water absorption.

For productivity improvement, the drawing rate of optical fiber is increased in the recent years. In this regard, both the primary and secondary coating materials are required to be fast curing and low viscous. To meet such requirements, UV-curable resin compositions based on urethane acrylate resins were proposed. JP-B 1-19694 and Japanese Patent Nos. 2,522,663 and 2,547,021 disclose liquid UV-curable resin compositions comprising a urethane acrylate oligomer, a reactive monomer, and a polymerization initiator. These compositions, however, encounter a limit in reducing water absorption or viscosity since acrylic groups are introduced into a straight chain polyether or polyester at its molecular chain ends through urethane bonds so that the concentration of urethane bonds is high.

SUMMARY OF THE INVENTION

An object of the invention is to provide a liquid radiation-curbable resin composition having a low viscosity to accommodate for high-speed coating and curing into a film with improved properties, especially a minimized water absorption. Another object is to provide a coating composition for optical fibers, and an optical fiber having a cured coating layer thereof.

It has been found that a liquid radiation-curable resin composition mainly comprising the reaction product obtained by reacting a polyether of the following general formula (1):

$$CH_2=CRCOO(C_mH_{2m}O)_nH \qquad (1)$$

wherein R is hydrogen or methyl, m is a number of 2 to 6, and n is a number of 6 to 100, with a diisocyanate having two isocyanate groups in a molecule, or the reaction product obtained by reacting a polyether of formula (1) and a (meth)acrylate compound containing a hydroxyl group and having a molecular weight of up to 300 with a diisocyanate having two isocyanate groups in a molecule is effectively curable. Since the reaction product has a low concentration of urethane bonds within a molecule, the composition can be reduced in both water absorption and viscosity.

In one aspect, the invention provides a liquid radiation-curable resin composition comprising the reaction product obtained by reacting (A) a polyether of the following general formula (1):

$$CH_2=CRCOO(C_mH_{2m}O)_nH \qquad (1)$$

wherein R is hydrogen or methyl, m is a number of 2 to 6, and n is a number of 6 to 100, with (B) a diisocyanate having two isocyanate groups in a molecule, in a molar ratio from 1.8/1 to 2.2/1.

In another aspect, the invention provides a liquid radiation-curable resin composition comprising the reaction product obtained by reacting the components (A) and (B) and (C) a (meth)acrylate compound containing a hydroxyl group and having a molecular weight of up to 300, in a molar ratio of (A)/(B)/(C) of (1.8–1.2)/1/(0.8–1.2).

In a further aspect, the invention provides a coating composition for optical fibers comprising the liquid radiation-curable resin composition defined above.

An optical fiber having a coating layer of the coating composition in cured stated is also contemplated herein.

DESCRIPTION OF THE PREFERRED EMBODIMENT

Component (A) is a polyether having a (meth)acryloyl group at one end of a molecular chain and a hydroxyl group at the other end, represented by the general formula (1).

$$CH_2=CRCOO(C_mH_{2m}O)_nH \qquad (1)$$

Herein R is hydrogen or methyl. It desired from the curing standpoint that R be hydrogen. Letter m is a number of 2 to 6, and desirably 3 to 5 while the polyether may be either a homopolymer or a copolymer. Letter n is a number of 6 to 100, and may be suitably selected in this range depending on the desired properties of a cured film. The polyether may be prepared by adding an alkylene oxide (e.g., propylene oxide, butylene oxide or tetrahydrofuran) to (meth)acrylic acid. The polyethers having a (meth)acryloyl group and a hydroxyl group at opposite ends of a molecular chain may be used alone or in admixture of two or more.

Component (B) is a diisocyanate having two isocyanate groups in a molecule, which may be selected from organic diisocyanates such as aromatic, aliphatic and alicyclic diisocyanates. Illustrative examples include tolylene diisocyanate, 4,4'-diphenylmethane diisocyanate, hydrogenated 4,4'-diphenylmethane diisocyanate, xylylene diisocyanate, hydrogenated xylylene diisocyanate, hexamethylene diisocyanate, and isophorone diisocyanate. Of these, tolylene diisocyanate and isophorone diisocyanate are preferred.

Component (C) is a (meth)acrylate compound containing a hydroxyl group and having a molecular weight of up to 300, examples of which include hydroxyalkyl (meth)acrylates such as 2-hydroxyethyl (meth)acrylate, 2- or 3-hydroxypropyl (meth)acrylate, 2- or 4-hydroxybutyl (meth)acrylate, and neopentyl glycol mono(meth)acrylate, and 4-hydroxycyclohexyl (meth)acrylate, cyclohexane-1,4-dimethanol mono(meth)acrylate, trimethylol propane di(meth)acrylate, 2-hydroxy-3-phenoxypropyl (meth) acrylate, 2-(meth)acryloyloxyethyl-2-hydroxyethyl phthalic acid, 3-acryloyloxyglycerin mono(meth)acrylate, and 2-hydroxy-1-(meth)acryloxy-3-(meth)acryloxypropane. These hydroxyl-containing (meth)acrylate compounds may be used alone or in admixture of two or more. The preferred hydroxyl-containing (meth)acrylate compounds are hydroxy $C_{2-4}$ alkyl (meth)acrylates, especially 2-hydroxyethyl (meth) acrylate and 2-hydroxypropyl (meth)acrylate.

The liquid radiation-curable resin composition of the invention contains as a main ingredient the reaction product obtained by reacting the above-described components (A) and (B) or components (A), (B) and (C). The reaction is based on reaction between terminal hydroxyl groups in component (A) and isocyanate groups in component (B) and in the latter case, further reaction between hydroxyl groups in component (C) and isocyanate groups in component (B), both of which may be effected in a conventional manner. The reaction product of components (A), (B) and (C) may be obtained by first reacting a polyether having a (meth) acryloyl group at one end of a molecular chain and a hydroxyl group at the other end with an isocyanate group to form a urethane and then reacting the remaining isocyanate group with a hydroxyl-containing (meth)acrylate compound. For the urethane-forming reaction, an amine catalyst or a metal catalyst such as a tin or lead catalyst may be used.

In the reaction of components (A) and (B), they are used in a molar ratio (A)/(B) of from 1.8/1 to 2.2/1. In the reaction of components (A), (B) and (C), they are used in a molar ratio (A)/(B)/(C) of (0.8–1.2)/1/(0.8–1.2).

These reaction products preferably have a viscosity of about 1,000 to 30,000 mPa·s at 25° C., and especially about 3,000 to 20,000 mPa·s at 25° C.

In addition to the reaction products, the liquid radiation-curable resin compositions of the invention may further contain ethylenically unsaturated compounds, for example, N-vinyl compounds and amino or hydroxyl-containing compounds having (meth)acrylic acid bonded through amidation or esterification reaction. Such compounds are mono-, di- and poly-functional compounds, which are described below.

Monofunctional Compounds

The N-vinyl compounds include N-vinylpyrrolidone, N-vinylcaprolactam, N-vinylacetamide and N-vinylformamide. The amino or hydroxyl-containing compounds having (meth)acrylic acid bonded through amidation or esterification reaction include methoxyethylene glycol (meth)acrylate, methoxypolyethylene glycol (meth)acrylate, nonylphenoxyethyl (meth)acrylate, nonylphenoxypolyethylene glycol (meth)acrylate, nonylphenoxypolypropylene glycol (meth)acrylate, 3-chloro-2-hydroxypropyl (meth) acrylate, phenoxyethyl (meth)acrylate, phenoxypolypropylene glycol (meth)acrylate, butoxypolyethylene glycol (meth)acrylate, alkyl (meth)acrylate, cyclohexyl (meth) acrylate, tetrahydrofurfuryl (meth)acrylate, isobornyl (meth) acrylate, benzyl (meth)acrylate, cumylphenol (meth) acrylate, cumylphenoxypolyethylene glycol (meth)acrylate, cumylphenoxypolypropylene glycol (meth)acrylate, 2-ethylhexyl (meth)acrylate, dicyclopentadiene (meth) acrylate, polypropylene glycol mono(meth)acrylate, polyethylene glycol mono(meth)acrylate, poly(ε-caprolactone mono(meth)acrylate), dialkylaminoethyl (meth)acrylates, glycidyl (meth)acrylate, mono[2-(meth)acryloyloxyethyl] acid phosphate, trichloroethyl (meth)acrylate, 2,2,3,3-tetrafluoropropyl (meth)acrylate, 2,2,3,4,4,4-hexafluorobutyl (meth)acrylate, perfluorooctylethyl (meth) acrylate, dicyclopentenyl (meth)acrylate, dicyclopentenyloxyalkyl (meth)acrylates, tricyclodecanyl (meth)acrylate, tricyclodecanyloxyethyl (meth)acrylate, tricyclodecanyloxyethyl (meth)acrylate, isobornyloxyethyl (meth)acrylate, and morpholine (meth)acrylate.

Difunctional Compounds

Examples include di(meth)acrylate of 2,2-dimethyl-3-hydroxypropyl-2,2-dimethyl-3-hydroxypropionate, ethylene glycol di(meth)acrylate, tetraethylene glycol di(meth) acrylate, polyethylene glycol di(meth)acrylate, propylene glycol di(meth)acrylate, polypropylene glycol di(meth) acrylate, 1,4-butanediol di(meth)acrylate, 1,6-hexanediol di(meth)acrylate, neopentylglycerin di(meth)acrylate, di(meth)acrylate of bisphenol A ethylene oxide adduct, di(meth)acrylate of bisphenol A propylene oxide adduct, 2,2'-di(hydroxyethoxyphenyl)propane di(meth)acrylate, tricyclodecane-dimethanol di(meth)acrylate, dicyclopentadiene di(meth)acrylate, pentane di(meth)acrylate, and 2,2-bis(glycidyloxyphenyl)propane di(meth)acrylic acid adduct.

Polyfunctional Compounds

Examples include trimethylol propane tri(meth)acrylate, trimethylol propane trioxyethyl (meth)acrylate, pentaerythritol tetra(meth)acrylate, dipentaerythritol hexa(meth) acrylate, tris(acryloxymethyl) isocyanurate, tris (acryloxyethyl) isocyanurate, tris(acryloxypropyl) isocyanurate, triallyl trimellitic acid, and triallyl isocyanurate.

These compounds are preferably blended in amounts of about 10 to 200 parts, and especially about 20 to 100 parts by weight per 100 parts by weight of the reaction product of components (A) and (B) or the reaction product of components (A), (B) and (C).

For improving radiation curing of the composition, any of well-known photo-polymerization initiators may be used. Examples of the photo-polymerization initiator include 1-hydroxycyclohexyl phenyl ketone, 2,2-dimethoxy-2-phenylacetophenone, phenylacetophenone diethyl ketal, alkoxyacetophenones, benzyl methyl ketal, benzophenone and benzophenone derivatives (e.g., 3,3-dimethyl-4-methoxy-benzophenone, 4,4-dimethoxybenzophenone and 4,4-diaminobenzophenone), alkyl benzoylbenzoates, bis(4-dialkylaminophenyl)ketone, benzyl and benzyl derivatives (e.g., benzyl methyl ketal), benzoin and benzon derivatives (e.g., benzoin butyl methyl ketal), benzoin isopropyl ether, 2-hydroxy-2-methylpropiophenone, thioxanthone derivatives (e.g., 2,4-diethylthioxanthone and 2,4-dichlorothioxanthone), fluorene, 2-methyl-1-[4-(methylthio) phenyl]-2-morpholinopropane-1,2-benzyl-2-dimethylamino-1-(morpholinophenyl)-butanone-1, and phosphine oxide derivatives (e.g., 2,4,6-trimethylbenzoyldiphenylphosphine oxide and bis(2,6-dimethoxybenzoyl)-2,4,4-trimethylpentylphosphine oxide).

These photo-polymerization initiators are preferably blended in amounts of about 0.01 to 20 parts, and especially about 0.1 to 10 parts by weight per 100 parts by weight of the reaction product.

If necessary, other additives may be added to the resin composition of the invention insofar as the object of the invention is not impaired. Such additives include stabilizers such as antioxidants and UV absorbers, organic solvents, plasticizers, surfactants, silane coupling agents, coloring pigments, and organic or inorganic particles.

The resin composition of the invention is prepared by blending, agitating and mixing the necessary components.

The composition should desirably have a viscosity of about 500 to 10,000 centipoise at 25° C. from the working standpoint to match with conventional manufacturing conditions of optical fibers, and especially about 500 to 4,000 centipoise at 25° C. under high-speed manufacturing conditions.

When the liquid radiation-curable resin composition of the invention is used as a primary coating material on optical fibers, it is directly coated and cured onto an optical glass fiber to form a cured coating. The primary coating material should desirably have a Young's modulus of up to 0.1 kgf/m$^2$ for protecting the optical fiber from microbends by external stresses and temperature changes. A secondary coating material is further coated on the primary coating for the purpose of mechanically protecting the optical fiber. When the resin composition is used as the secondary coating material, it should desirably have a Young's modulus of at least 0.5 kgf/mm$^2$. The Young's modulus can be adjusted by changing the value of n in formula (1) representing the polyether. The polyether should desirably have n=50 to 100 when used as the primary coating material and n=6 to 50 when used as the secondary coating material.

For curing the liquid radiation-curable resin composition of the invention, use may be made of infrared radiation, visible light, ultraviolet radiation, x-rays, electron beams, and ionizing radiations such as α-rays, β-rays and γ-rays, with the UV radiation being preferred. Curing can be effected under conventional conditions.

EXAMPLES

Examples of the invention are given below by way of illustration and not by way of limitation.

Synthesis Example 1

A reactor was charged with 200 g (0.2 mol) of an acrylic compound represented by $CH_2$=$CHCOO(C_3H_6O)_{16}$-H available under the tradename Blenmer AP-1000 (Nippon Oil and Fat K.K.), 0.1 g of 2,6-di-tert-butylhydroxytoluene and 0.2 g of dibutyltin dilaurate. In a nitrogen stream, 17.4 g (0.1 mol) of 2,4-tolylene diisocyanate was added dropwise to the reactor at 20° C. over one hour. Reaction was effected at 65° C. for 4 hours, obtaining an oligomer A having acrylic groups at both ends. It was a pale yellow liquid having a viscosity of 4,500 mPa s at 25° C.

Synthesis Example 2

A reactor was charged with 100 g (0.1 mol) of Blenmer AP-1000 (acrylic compound), 0.1 g of 2,6-di-tert-butylhydroxytoluene and 0.2 g of dibutyltin dilaurate. In a nitrogen stream, 17.4 g (0.1 mol) of 2,4-tolylene diisocyanate was added dropwise to the reactor at 20° C. over one hour. After the reaction mixture was agitated at 30° C. for 2 hours, 11.6 g (0.1 mol) of hydroxyethyl acrylate was added dropwise over 30 minutes. Reaction was effected at 65° C. for 4 hours, obtaining an oligomer B having acrylic groups at both ends. It was a pale yellow liquid having a viscosity of 12,600 mPa·s at 25° C.

Comparative Synthesis Example 1

A reactor was charged with 100 g (0.1 mol) of polypropylene glycol having a molecular weight of 1,000, 0.1 g of 2,6-di-tert-butylhydroxytoluene and 0.2 g of dibutyltin dilaurate. In a nitrogen stream, 34.8 g (0.2 mol) of 2,4-tolylene diisocyanate was added dropwise to the reactor at 20° C. over one hour. Then 23.2 g (0.2 mol) of hydroxyethyl acrylate was added dropwise over 30 minutes. Reaction was effected at 65° C. for 4 hours, obtaining an oligomer C having acrylic groups at both ends. It was a pale yellow, viscous liquid having a viscosity of 53,000 mPa·s at 25° C.

Examples 1–2 and Comparative Example 1

Liquid radiation-curable resin compositions of Examples 1 and 2 and Comparative Example 1 were prepared by mixing the acrylate oligomer synthesized above, an ethylenically unsaturated group-containing compound (isobornyl acrylate), and a photo-polymerization initiator (Rusilin TPO by BASF AG) as shown in Table 1. The compositions were examined by the following tests. The results are also shown in Table 1.

(1) Formation of cured film

The liquid resin composition was applied onto a glass plate and irradiated with UV radiation in a dose of 500 mJ/cm$^2$ (main wavelength 350 nm), obtaining a cured film of 200 μm thick.

(2) Young's modulus

After the cured film was conditioned for 24 hours at 25° C. and RH 50%, the Young's modulus of the film was measured by pulling it 2.5% under conditions: a distance between two gage marks of 25 mm and a pulling rate of 1 mm/min.

(3) Tensile strength and elongation at rupture

After the cured film was conditioned for 24 hours at 25° C. and RH 50%, the film was measured for tensile strength and elongation at rupture under conditions: a distance between two gage marks of 25 mm and a pulling rate of 50 mm/min.

(4) Water absorption

The weight of the cured film was measured before and after it was dipped in water at 25° C. for 24 hours, from which a percent weight gain was calculated.

TABLE 1

| Composition (pbw) | E1 | E2 | CE1 |
|---|---|---|---|
| Acrylate oligomer A | 60 | | |
| Acrylate oligomer B | | 60 | |
| Acrylate oligomer C | | | 60 |
| Isobornyl acrylate | 30 | 30 | 30 |
| N-vinylcaprolactam | 10 | 10 | 10 |
| Polymerization initiator | 1.5 | 1.5 | 1.5 |
| Physical properties | | | |
| Liquid viscosity (mPa · s) | 1,150 | 2,900 | 9,600 |
| Young's modulus (kgf/mm$^2$) | 20 | 40 | 40 |
| Elongation at rupture (%) | 80 | 45 | 40 |
| Tensile strength (kgf/mm$^2$) | 1.5 | 2.5 | 2.8 |
| Water absorption (%) | 1.4 | 2.0 | 3.0 |

There has been described a liquid radiation-curable resin composition which has a viscosity low enough to accommodate for high-speed coating and cures into a film with improved cured properties, especially a minimized water absorption. The composition is best suited for the coating of optical fibers.

Japanese Patent Application No. 11-225956 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A liquid radiation-curable resin composition comprising the reaction product obtained by reacting (A) a polyether of the following general formula (1):

wherein R is hydrogen or methyl, m is a number of 2 to 6, and n is a number of 6 to 100, (B) a diisocyanate having two isocyanate groups in a molecule, and (C) a (meth)acrylate compound containing a hydroxyl group and having a molecular weight of up to 300, in a molar ratio of (A)/(B)/(C) of (1.8–1.2)/1/(0.8–1.2).

2. A coating composition for optical fibers comprising the liquid radiation-curable resin composition of claim 1.

3. An optical fiber having a coating layer of the composition of claim 2, in a cured state.

4. The liquid radiation-curable resin composition of claim 1, wherein (A) is an acrylate oligomer of the formula 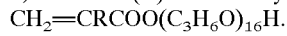

5. The liquid radiation-curable resin composition of claim 1, wherein (B) is a diisocyanate compound selected from the group consisting of tolylene diisocyanate and isophorone diisocyanate.

6. The liquid radiation-curable resin composition of claim 1, wherein (C) is a (meth)acrylate compound selected from the group consisting of 2-hydroxyethyl (meth)acrylate and 2-hydroxypropyl (meth)acrylate.

7. The liquid radiation-curable resin composition of claim 1, further comprising 20 to 100 parts by weight of an N-vinylcaprolactam or an isobornyl (meth)acrylate per 100 parts by weight of the reaction product of components (A), (B), and (C).

8. The liquid radiation-curable resin composition of claim 1, further comprising 0.1 to 10 parts by weight of a photopolymerization initiator per 100 parts by weight of the reaction product of components (A), (B), and (C).

* * * * *